(12) United States Patent  
Xiao

(10) Patent No.: US 10,903,478 B2  
(45) Date of Patent: Jan. 26, 2021

(54) PROTECTIVE COATING FOR LITHIUM-CONTAINING ELECTRODE AND METHODS OF MAKING THE SAME

(71) Applicant: GM GLOBAL TECHNOLOGY OPERATIONS LLC, Detroit, MI (US)

(72) Inventor: Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 15/947,272

(22) Filed: Apr. 6, 2018

(65) Prior Publication Data

US 2019/0312254 A1 Oct. 10, 2019

(51) Int. Cl.
*H01M 4/04* (2006.01)
*H01M 10/052* (2010.01)
*H01M 10/04* (2006.01)

(52) U.S. Cl.
CPC ....... *H01M 4/0404* (2013.01); *H01M 10/045* (2013.01); *H01M 10/052* (2013.01)

(58) Field of Classification Search
None
See application file for complete search history.

(56) References Cited

U.S. PATENT DOCUMENTS

| 4,925,751 A * | 5/1990 | Shackle | H01M 4/02 |
| | | | 429/314 |
| 6,235,425 B1 * | 5/2001 | Hanson | H01M 4/04 |
| | | | 29/623.3 |

| 8,974,946 B2 | 3/2015 | Cai et al. |
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,437,871 B2 | 9/2016 | Zhou et al. |
| 9,537,144 B2 | 1/2017 | Huang et al. |
| 9,647,254 B2 | 5/2017 | Dadheech et al. |
| 9,742,028 B2 | 8/2017 | Zhou et al. |

(Continued)

FOREIGN PATENT DOCUMENTS

| CN | 110350151 A | 10/2019 |
| DE | 102019107934 A1 | 10/2019 |

OTHER PUBLICATIONS

Fan et al., "Highly Fluorinated Interphases Enable High-Voltage Li-Metal Batteries"; Chem 4, 174-185, Jan. 11, 2018 © 2017 Elsevier Inc.

(Continued)

*Primary Examiner* — Tracy M Dove
(74) *Attorney, Agent, or Firm* — Harness, Dickey & Pierce, P.L.C.

(57) ABSTRACT

A lithium-containing electrode with a protective coating and lithium-containing electrochemical cells including the same are provided herein. The protective coating has a first layer including a first fluoropolymeric matrix and Li—F compounds and a second layer including a second fluoropolymeric matrix. Methods of preparing the protective coating on the lithium-containing electrode by applying a first fluoropolymer and/or a first fluoropolymer precursor and a second fluoropolymer and/or a second fluoropolymer precursor are also provided herein.

10 Claims, 10 Drawing Sheets

(56) References Cited

U.S. PATENT DOCUMENTS

| | | |
|---|---|---|
| 9,896,763 B2 | 2/2018 | Dadheech et al. |
| 9,905,847 B2 | 2/2018 | Dadheech et al. |
| 10,431,849 B2 | 10/2019 | Yersak et al. |
| 2009/0004568 A1* | 1/2009 | Hirose .................. H01M 4/626 429/221 |
| 2011/0177398 A1* | 7/2011 | Affinito ................ H01M 4/366 429/325 |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0236324 A1 | 8/2015 | Xiao et al. |
| 2015/0349307 A1 | 12/2015 | Dadheech et al. |
| 2016/0020491 A1 | 1/2016 | Dai et al. |
| 2016/0111721 A1 | 4/2016 | Xiao et al. |
| 2016/0141598 A1 | 5/2016 | Dai et al. |
| 2016/0172665 A1 | 6/2016 | Zhou et al. |
| 2016/0172681 A1 | 6/2016 | Yang et al. |
| 2016/0172706 A1 | 6/2016 | Xiao et al. |
| 2016/0172710 A1 | 6/2016 | Liu et al. |
| 2016/0218342 A1 | 7/2016 | Xiao et al. |
| 2016/0254567 A1 | 9/2016 | Cai et al. |
| 2016/0372743 A1* | 12/2016 | Cho ...................... H01M 4/382 |
| 2017/0141382 A1 | 5/2017 | Dadheech et al. |
| 2017/0162859 A1 | 6/2017 | Yang et al. |
| 2017/0214079 A1 | 7/2017 | Dai et al. |
| 2017/0222210 A1 | 8/2017 | Xiao |
| 2017/0271678 A1 | 9/2017 | Yang et al. |
| 2017/0288230 A1 | 10/2017 | Yang et al. |
| 2017/0338490 A1 | 11/2017 | Xiao et al. |
| 2018/0048022 A1 | 2/2018 | Yang et al. |
| 2018/0309166 A1 | 10/2018 | Yersak et al. |
| 2018/0375148 A1 | 12/2018 | Yersak et al. |

OTHER PUBLICATIONS

Qian, J. et al., "High rate and stable cycling of lithium metal anode". *Nat. Commun.* 6. 6362. doi: 10.1038/ncomms7362, 2015, 9 pages.

Markevich et al. "Fluoroethylene Carbonate as an Important Component for the Formation of an Effective Solid Electrolyte Interphase on Anodes and Cathodes for Advanced Li-Ion Batteries"; ACS Energy Lett. 2017, 2, 1337?1345; DOI: 10.1021/acsenergylett.7b00163.

Zhang et al., "Fluoroethylene Carbonate Additives to Render Uniform Li Deposits in Lithium Metal Batteries" *Adv. Funct. Mater.* 2017, 27, 1605989; 8 pages.

* cited by examiner

US 10,903,478 B2

PROTECTIVE COATING FOR LITHIUM-CONTAINING ELECTRODE AND METHODS OF MAKING THE SAME

GOVERNMENT SUPPORT

This invention was made with government support under DE-EE0007787 awarded by the Department of Energy. The Government has certain rights in the invention.

INTRODUCTION

The present disclosure relates generally to lithium-containing electrodes, and more specifically, to protective coatings for lithium-containing electrodes, for example, negative lithium metal electrodes, for lithium-containing electrochemical cells, such as lithium ion batteries, and methods of preparing such protective coatings.

An electrochemical cell, such as a battery, is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

High-energy density, electrochemical cells, such as lithium ion batteries can be used in a variety of consumer products and vehicles, such as Hybrid Electric Vehicles (HEVs) and Electric Vehicles (EVs). Typical lithium ion, lithium sulfur, and lithium metal batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium ion batteries operate by reversibly passing lithium-ions back and forth between the negative electrode and the positive electrode. A separator and an electrolyte are disposed between the negative and positive electrodes. The electrolyte is suitable for conducting lithium ions and may be in solid (e.g., solid state diffusion) or liquid form. Each of the negative and positive electrodes is typically carried on or connected to a metallic current collector, for example, in the form of a thin layer of electrode material. The current collectors may be connected to each other by an interruptible external circuit through which electrons can pass from one electrode to the other while lithium ions migrate in the opposite direction through the electrochemical cell during charging and discharge of the battery.

Lithium ion batteries can reversibly supply power to an associated load device on demand. More specifically, electrical power can be supplied to a load device by a lithium ion battery until the lithium content of the negative electrode is effectively depleted. The battery may then be recharged by passing a suitable direct electrical current in the opposite direction between the electrodes.

During discharge, the negative electrode may contain a relatively high concentration of intercalated lithium, which is oxidized into lithium ions and electrons. The lithium ions travel from the negative electrode (anode) to the positive electrode (cathode), for example, through the ionically conductive electrolyte solution contained within the pores of an interposed porous separator. At the same time, the electrons pass through the external circuit from the negative electrode to the positive electrode. The lithium ions may be assimilated into the material of the positive electrode by an electrochemical reduction reaction. The battery may be recharged after a partial or full discharge of its available capacity by an external power source, which reverses the electrochemical reactions that transpired during discharge.

During re-charge, intercalated lithium in the positive electrode is oxidized into lithium ions and electrons. The lithium ions travel from the positive electrode to the negative electrode through the porous separator via the electrolyte, and the electrons pass through the external circuit to the negative electrode. The lithium cations are reduced to elemental lithium at the negative electrode and stored in the material of the negative electrode for reuse.

SUMMARY

This section provides a general summary of the disclosure, and is not a comprehensive disclosure of its full scope or all of its features.

In certain aspects, the present disclosure provides a method for preparing a protective coating on a Li-containing electrode having a surface comprising lithium. The method may include applying a first fluoro-matrix precursor to a surface of a Li-containing layer of the Li-containing electrode to form a first layer including a first fluoropolymeric matrix and Li—F compounds. The first fluoro-matrix precursor may include a first fluoropolymer and/or a first fluoropolymer precursor. The method may further include applying a second fluoro-matrix precursor to the Li-containing electrode to form a second layer including a second fluoropolymeric matrix. The second fluoro-matrix precursor may include a second fluoropolymer and/or a second fluoropolymer precursor. The second layer may be adjacent to the first layer. The first layer can have a fluorine content greater than the second layer.

The first layer may have a fluorine content of about 5 at % to about 70 at %.

The first layer may have a thickness of about 1 nm to about 5 µm, and/or the second layer may have a thickness of about 1 nm to about 5 µm.

The first fluoro-matrix precursor and the second fluoro-matrix precursor may be the same or different. The first fluoropolymer and the second fluoropolymer may be the same or different and/or the first fluoropolymer precursor and the second fluoropolymer precursor are the same or different.

The first fluoropolymer and the second fluoropolymer may each be selected from the group consisting of polyvinyl fluoride (PVF), polyvinylidene fluoride (PVDF), polytetrafluoroethylene (PTFE), polychlorotrifluoroethylene (PCTFE), perfluoroalkoxy alkane (PFA), fluorinated ethylene propylene (FEP), ethylene tetrafluoroethylene (ETFE), ethylene chlorotrifluoroethylene (ECTFE), perfluoro-elastomer (FFPM), and a combination thereof, and/or the first fluoropolymer precursor and the second fluoropolymer precursor each form a polymer selected from the group consisting of PVF, PVDF, PTFE, PCTFE, PFA, FEP, ETFE, ECTFE, FFPM, and a combination thereof.

The first fluoropolymer may be PTFE and the second fluoropolymer may be PVDF.

The first fluoropolymer and/or the second fluoropolymer can be applied by physical vapor deposition, chemical vapor deposition, or wet chemistry.

The method may further include treating the Li metal electrode to remove a passivation layer present on the Li-containing layer before applying the first fluoropolymer or the first fluoropolymer precursor.

The method may further include after applying the first fluoropolymer and/or the first fluoropolymer precursor and/ or after applying the second fluoropolymer and/or the second fluoropolymer precursor, maintaining the Li-containing electrode at a temperature of less than or equal to about 150° C. for up to about 24 hours.

In other aspects, the present disclosure provides a Li-containing electrode. The Li-containing electrode may include a Li-containing layer, a first layer adjacent to a surface of the Li-containing layer, and a second layer adjacent to the first layer. The first layer may include a first fluoropolymeric matrix and Li—F compounds. The second layer may include a second fluoropolymeric matrix. The first layer can have a fluorine content greater than the second layer.

The first layer may have a fluorine content of about 5 at % to about 70 at %.

The first layer may have a thickness of about 1 nm to about 5 μm, and/or the second layer may have a thickness of about 1 nm to about 5 μm.

The first fluoropolymeric matrix and the second fluoropolymeric matrix may each be derived from a fluoropolymer selected from the group consisting of polyvinyl fluoride (PVF), polyvinylidene fluoride (PVDF), polytetrafluoroethylene (PTFE), polychlorotrifluoroethylene (PCTFE), perfluoroalkoxy alkane (PFA), fluorinated ethylene propylene (FEP), ethylene tetrafluoroethylene (ETFE), ethylene chlorotrifluoroethylene (ECTFE), perfluoro-elastomer (FFPM), and a combination thereof.

The first fluoropolymeric matrix may be derived from PTFE and the second fluoropolymeric matrix may be derived from PVDF.

In other aspects, the present disclosure provides a Li-containing electrochemical cell. The Li-containing cell may include a negative electrode layer including a Li-containing electrode, a positive electrode layer spaced apart from the negative electrode layer, a porous separator disposed between confronting surfaces of the negative electrode layer and the positive electrode layer, and a liquid electrolyte infiltrating the negative electrode layer, the positive electrode layer, and the porous separator. The Li-containing electrode may include a Li-containing layer, a first layer adjacent to a surface of the Li-containing layer, and a second layer adjacent to the first layer. The first layer may include a first fluoropolymeric matrix and Li—F compounds. The second layer may include a second fluoropolymeric matrix. The first layer can have a fluorine content greater than the second layer.

The first layer may have a fluorine content of about 5 at % to about 70 at %

The first layer may have a thickness of about 1 nm to about 5 μm, and/or the second layer may have a thickness of about 1 nm to about 5 μm.

The first fluoropolymeric matrix and the second fluoropolymeric matrix may each be derived from a fluoropolymer selected from the group consisting of polyvinyl fluoride (PVF), polyvinylidene fluoride (PVDF), polytetrafluoroethylene (PTFE), polychlorotrifluoroethylene (PCTFE), perfluoroalkoxy alkane (PFA), fluorinated ethylene propylene (FEP), ethylene tetrafluoroethylene (ETFE), ethylene chlorotrifluoroethylene (ECTFE), perfluoro-elastomer (FFPM), and a combination thereof.

The first fluoropolymeric matrix may be derived from PTFE and the second fluoropolymeric matrix may be derived from PVDF.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
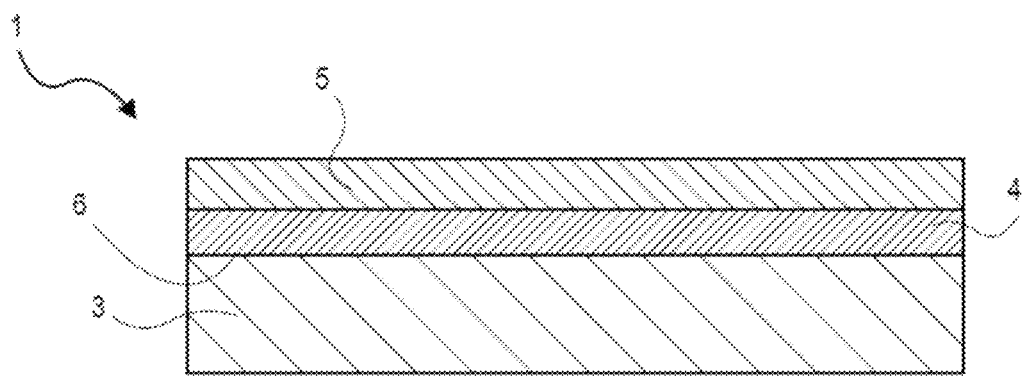
FIG. 1A is a cross-sectional view of a lithium-containing electrode with a protective coating according to one aspect of the disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

I. Lithium-Containing Electrode with Protective Coating and Methods of Making the Same A lithium-containing (Li-containing) electrode comprising a multi-layer protective coating is provided herein. It has been discovered that a multi-layer, for example, a two layer, protective coating including a fluoropolymeric matrix and lithium-fluoride (Li—F) bonds or Li—F compounds on a Li-containing electrode can advantageously prevent and/or reduce lithium dendrite growth and mossy lithium formation on the Li-containing electrode. In various aspects, the multi-layer protective coating as described in more detail below can act as an artificial solid electrolyte interphase (SEI) on a Li-containing electrode and, by suppressing lithium dendrite growth and mossy lithium formation, can improve cycle efficiency of an electrochemical cell.

For example, as best shown in FIG. 1A, a Li-containing electrode 1 having a surface comprising lithium includes a Li-containing layer 3 and a protective coating comprising at least a first layer 4 and a second layer 5. In some embodiments, the Li-containing electrode 1 having a surface comprising lithium electrode can be a homogenous lithium electrode or an electrode having only a Li-containing surface layer. The first layer 4 may be adjacent to or disposed on a surface 6 of the Li-containing layer 3. The second layer 5 may be adjacent to or disposed on the first layer 4. The first layer 4 may comprise a first fluoropolymeric matrix and lithium-fluorine (Li—F) bonds or Li—F compounds. The second layer 5 may comprise a second fluoropolymeric matrix. In some embodiments, the first layer 4 and/or the second layer 5 may each have thickness of at least about 1 nm, at least about 50 nm, at least about 100 nm, at least about 200 nm, at least about 400 nm, at least about 600 nm, at least about 800 nm, at least about 1 µm, at least about 2.5 µm, at least about 5 µm, or about 10 µm; or in a range from about 1 nm to about 10 µm, 1 nm to about 5 µm, 1 nm to about 1 µm, or about 10 nm to about 200 nm. Although not shown, it is contemplated herein that the protective coating may comprise only one layer, for example, first layer 4 or second layer 5, or may comprise more than two layers, such as but not limited to, four layers, five layers, six layers, etc.

Figure 1B:
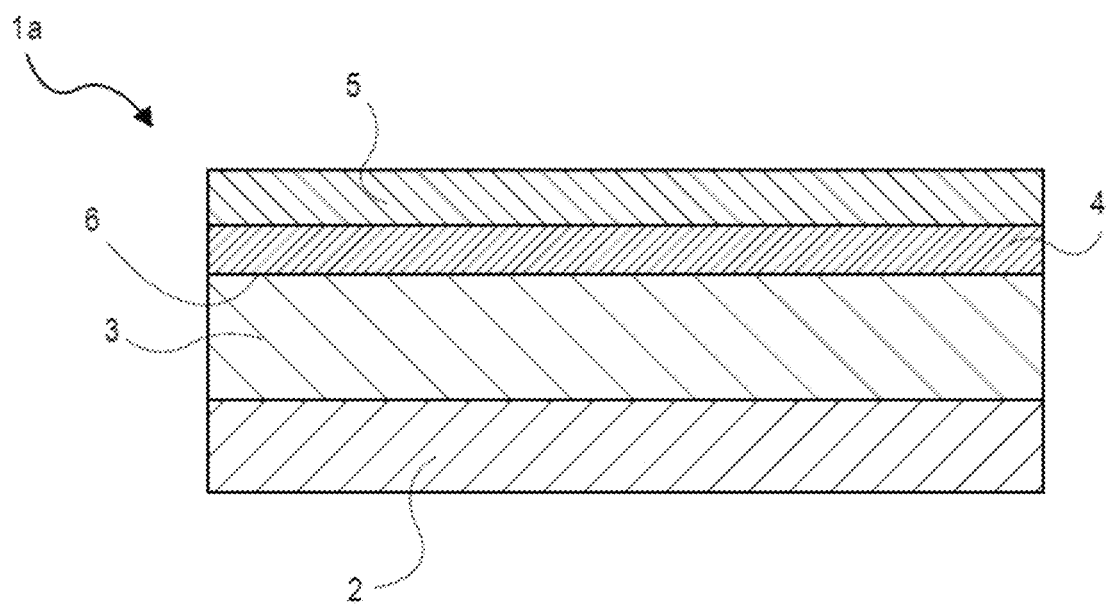
FIG. 1B is a cross-sectional view of a lithium-containing electrode with a protective coating according to another aspect of the disclosure.

Optionally, as shown in FIG. 1B, the Li-containing layer 3 may be disposed on a substrate 2 in Li-containing electrode 1a. The substrate 2 may be any suitable material, for example, a metallic foil, such as but not limited to, copper, nickel, stainless steel, or titanium foils. When assembled in an electrochemical cell, a current collector, such as a negative current collector (further described below), may serve as a substrate on which the Li-containing layer is disposed.

In any embodiment, the first fluoropolymeric matrix and/or the second fluoropolymeric matrix may be derived from and/or based on a fluoropolymer and/or a fluoropolymer precursor, which can be applied to a Li-containing electrode to form a first layer and a second layer. Thus, methods of preparing a protective coating on a Li-containing electrode are also provided herein. In any embodiment, the method may include applying a first fluoro-matrix precursor to a surface 6 of a Li-containing layer 3 to form a first layer 4. The first fluoro-matrix precursor may comprise a first fluoropolymer, a first fluoropolymer precursor, or a combination thereof. In various aspects, where a first fluoropolymer precursor is used, the first fluoropolymer precursor may include a monomer used to form the first fluoropolymer. In such instances, the first fluoropolymer precursor and/or the correspondingly formed first fluoropolymer can be applied to a Li-containing electrode. The first fluoro-matrix precursor, e.g., the first fluoropolymer and/or the first fluoropolymer precursor, may be applied under suitable conditions such that a defluorination reaction occurs whereby at least a portion of the fluorine atoms present in the first fluoropolymer and/or the first fluoropolymer precursor dissociate from the first fluoropolymer and/or the first fluoropolymer precursor and a first layer 4 is formed on the Li-containing layer 3. More specifically, at least a portion of the dissociated fluorine atoms bond to at least a portion of the lithium atoms, for example, in the Li-containing layer 3, to form Li—F bonds or Li—F compounds in the first layer 4. Additionally, at least a portion of the defluorinated first fluoropolymer and/or the defluorinated first fluoropolymer precursor may be deposited on at least a portion of the Li-containing layer 3 to form a carbon-containing first fluoropolymer matrix of the first layer 4. It is contemplated herein that the defluorinated first fluoropolymer and/or the defluorinated first fluoropolymer precursor may include some fluorine atoms or may include no fluorine atoms. In some embodiments, at least a portion of the first fluoropolymeric matrix may comprise or be bonded to the Li—F compounds. For example, the Li—F may be present as particles, such as nano-sized crystals, within and/or bonded with the first fluoropolymeric matrix. The first layer 4 may be present on at least a portion of the surface area of the Li-containing layer 3 up to substantially all of the surface area (greater than 98%, greater than 99% or 100% of the surface area) of the Li-containing layer 3. In some embodiments, the method may optionally further comprise treating the Li-metal electrode 1 to remove a passivation layer, such as lithium oxide layer, lithium carbonate layer, lithium nitride layer, and/or a lithium hydroxide layer, present on the Li-containing layer 3 before applying the first fluoro-matrix precursor, e.g., the first fluoropolymer and/or the first fluoropolymer precursor. In such instances, the Li-containing electrode 1 may be treated with an argon plasma or by mechanical means, such as but not limited to, scratching, polishing, and blasting to remove the passivation layer. Removal of a passivation layer can result in better interfacial adhesion between the first layer 4 and the Li-containing layer 3.

The method may further include applying a second fluoro-matrix precursor to the Li-containing electrode 1, for example, adjacent to the first layer 4 to form a second layer 5. The second fluoro-matrix precursor may comprise a second fluoropolymer, a second fluoropolymer precursor, or a combination thereof. In various aspects, where a second fluoropolymer precursor is used, the second fluoropolymer precursor may include a monomer used to form the second fluoropolymer. In such instances, the second fluoropolymer precursor and/or the correspondingly formed second fluoropolymer can be applied to a Li-containing electrode. The second fluoro-matrix precursor, e.g. the second fluoropolymer and/or the second fluoropolymer precursor, may be applied under suitable conditions such that a defluorination reaction occurs whereby at least a portion of the fluorine atoms present in the second fluoropolymer and/or the second fluoropolymer precursor dissociate from the second fluoropolymer and/or the second fluoropolymer precursor and a second layer 5 is formed. In any embodiment, at least a portion of the defluorinated second fluoropolymer and/or the defluorinated second fluoropolymer precursor may be deposited on at least a portion of the first layer 4 to form a carbon-containing second fluoropolymer matrix of the second layer 5. It is contemplated herein that the defluorinated second fluoropolymer and/or the defluorinated second fluoropolymer precursor may include some fluorine atoms or may include no fluorine atoms. In some embodiments, at least a portion of the disassociated fluorine atoms from the second fluoropolymer and/or the second fluoropolymer precursor may form Li—F bonds or Li—F compounds with the Li-containing layer 3. In some embodiments, the second layer 5 may also comprise Li—F bonds or Li—F compounds, for example, present within or bonded to the second fluoropolymeric matrix. The second layer 5 may be present on at least a portion of the surface area of the first layer 4 up to substantially all of the surface area (greater than 98%, greater than 99% or 100% of the surface area) of the first layer 4. In some embodiments, at least a portion of the second layer 5 may contact the Li-containing layer 3 (not shown). Optionally, the Li-containing electrode 1 may be maintained at a temperature of less than or equal to about 150° C. (e.g., about 20° C. to about 150° C., about 25° C. to about 100° C., etc.) for up to about 24 hours (e.g., about 1 hour to about 24 hours, about 2 hours to about 20 hours, about 5 hours to about 18 hours, etc.) after application of the first fluoropolymer and/or the first fluoropolymer precursor and before application of the second fluoropolymer and/or the second fluoropolymer precursor and/or after application of the second fluoropolymer and/or the second fluoropolymer precursor.

The first and/or second fluoropolymer may be any suitable fluoropolymer. In any embodiment, the first fluoropolymer and the second fluoropolymer may be the same or different. Non-limiting examples of fluoropolymers include polyvinyl fluoride (PVF), polyvinylidene fluoride (PVDF), polytetrafluoroethylene (PTFE), polychlorotrifluoroethylene (PCTFE), perfluoroalkoxy alkane (PFA), fluorinated ethylene propylene (FEP), ethylene tetrafluoroethylene (ETFE), ethylene chlorotrifluoroethylene (ECTFE), perfluoro-elastomer (FFPM), and a combination thereof. In some embodiments, the first fluoropolymer precursor may be PTFE, and the second fluoropolymer precursor may be PVDF.

The first and/or second fluoropolymer precursor may be any suitable precursor, such as a monomer, which can form the first and/or second fluoropolymer. In any embodiment, the first fluoropolymer precursor and the second fluoropolymer precursor may be the same or different. The first fluoropolymer precursor and the second fluoropolymer precursor each can form a polymer selected from the group consisting of polyvinyl fluoride (PVF), polyvinylidene fluoride (PVDF), polytetrafluoroethylene (PTFE), polychlorotrifluoroethylene (PCTFE), perfluoroalkoxy alkane (PFA), fluorinated ethylene propylene (FEP), ethylene tetrafluoroethylene (ETFE), ethylene chlorotrifluoroethylene (ECTFE), perfluoro-elastomer (FFPM), and a combination thereof.

The first and/or second fluoropolymeric matrix each has a structure derived from or based on the corresponding first and/or second fluoro-matrix precursor, e.g., the first and/or second fluoropolymer and/or the first and/or second fluoropolymer precursor, used during the preparation method, which may be similar, but may differ from the first and/or second fluoropolymer and/or the first and/or second fluoropolymer precursor. For example, following defluorination, the first and/or second fluoropolymeric matrix may comprise fewer fluorine atoms and/or hydrogen atoms compared to the corresponding first and/or second fluoropolymer and/or the first and/or second fluoropolymer precursor. For example, if the first and/or second fluoropolymer used to form the first layer or second layer is polytetrafluoroethylene (PTFE), which has the following structure (I):

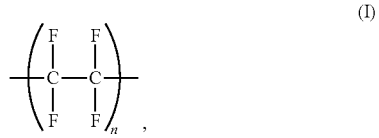

the resultant first and/or second fluoropolymeric matrix formed may have a structure similar to structure (I) but with fewer fluorine atoms and/or hydrogen atoms than structure (I), which may be replaced with carbon to carbon (C—C) bonds to form the carbon-containing first and/or second fluoropolymeric matrix. The first and/or second fluoropolymeric matrix may also include Li—F bonds or Li—F compounds as described above. In some embodiments, the first and/or second fluoropolymeric matrix each may be derived from a fluoropolymer selected from the group consisting of PVF, PVDF, PTFE, PCTFE, PFA, FEP, ETFE, ECTFE, FFPM, and a combination thereof. In some embodiments, the first fluoropolymeric matrix may be derived from PTFE, and the second fluoropolymeric matrix may be derived from PVDF.

In various aspects, the first layer 4 and/or the second layer 5 may have a fluorine content of at least about 5 at %, at least about 10 at %, at least about 20 at %, at least about 30 at %, at least about 40 at %, at least about 50 at %, or at least about 60 at %, or about 70 at %; or in a range from about 5 at % to about 70 at %, about 5 at % to about 60 at %, about 5 at % to about 50 at %, about 20 at % to about 50 at % or about 30 at % to about 50 at %. In certain aspects, the first layer 4 may have a fluorine content greater than the second layer 5, which may be achieved due to selection of the first and second fluoropolymer and/or the first and/or second fluoropolymer precursors and/or due to process parameters under which the first and second fluoropolymer precursors are applied to the Li-containing electrode 1. For example, a first layer 4 may have a greater fluorine content than a second layer 5 where the first fluoropolymer used is PTFE and the second fluoropolymer used is PVDF. Additionally or alternatively, a first layer 4 may have a greater fluorine content than a second layer 5 as a result of the process parameters used when applying the first and second fluoropolymer and/or fluoropolymer precursors, for example, where the first and second fluoropolymer are the same. For example, when using a sputtering process to apply the same first and second fluoropolymer (e.g., PTFE) and/or the same first and second fluoropolymer precursor, the sputtering power can be controlled to adjust the fluorine content. Higher power (e.g., radio frequency power) during sputtering can break more C—F bonds in the fluoropolymer and/or fluoropolymer precursor (e.g., PTFE) and cause more defluorination during the defluorination reaction resulting in the formation of more Li—F bonds or Li—F compounds and also less F in the fluoropolymeric matrix, for example, of the first layer 4. An increase in L-F bonds or Li—F compounds can advantageously increase mechanical properties of the first layer 4.

The first and/or second fluoro-matrix precursor may be applied to a Li-containing electrode by any suitable means known in the art. For example, various known deposition techniques may be used to apply the first and second layer, such as but not limited to, physical vapor deposition (PVD) (e.g., thermal evaporation, sputtering, etc.) and chemical vapor deposition (CVD) (e.g., low pressure chemical vapor depositions (LPCVD), thermal CVD, etc. In any embodiment, in applying the first and/or second fluoro-matrix precursor, the deposition temperature may be about 18° C. to about 150° C., preferably about 18° C. to about 25° C., and the deposition time may be about 5 minutes to about 60 minutes, about 10 minutes to about 40 minutes or about 30 minutes. The deposition may be performed in the presence of an inert gas, such as but not limited to, Ar, for example 99.9% purity Ar. For sputtering processes, the sputtering power (radio frequency) may be about 50 W to about 200 W or about 100 to about 200 W, and the fluoro-matrix precursor may be sputtered from fluoropolymer plates or disks. Additionally or alternatively, wet chemistry techniques may be used as well, such as but not limited to, using a fluoropolymer precursor containing solution, such as a monomer containing solution, to coat a Li-containing electrode, for example, via a dip coating or spin coating process.

Advantageously, the first layer 4 and the second layer 5, which may serve as artificial solid electrolyte interphase (SEI), may have different beneficial functionalities, which can improve performance of the Li-containing electrode 1, for example, in a Li-containing electrochemical cell. For example, the first layer 4, which can have a higher fluorine content than the second layer 5, may have increased interfacial adhesion to the Li metal in the Li-containing layer 3 as well as increased mechanical strength, which can prevent and/or reduce detrimental lithium dendrite growth and mossy lithium formation. The second layer 5 can be more flexible to better accommodate volume change of the Li-containing electrode 1 during use. Overall, these combined functionalities can result in a Li-containing electrode having improved performance characteristics, such as increased cycle efficiency, when used in an electrochemical cell.

II. Lithium-Containing Electrochemical Cell

Lithium-containing electrochemical cells typically include a negative electrode, a positive electrode, an electrolyte for conducting lithium ions between the negative and positive electrodes, and a porous separator between the negative electrode and the positive electrode to physically separate and electrically insulate the electrodes from each other while permitting free ion flow. When assembled in an electrochemical cell, for example, in a lithium-ion battery or a lithium-sulfur battery, the porous separator is infiltrated with a liquid electrolyte.

Figure 2:
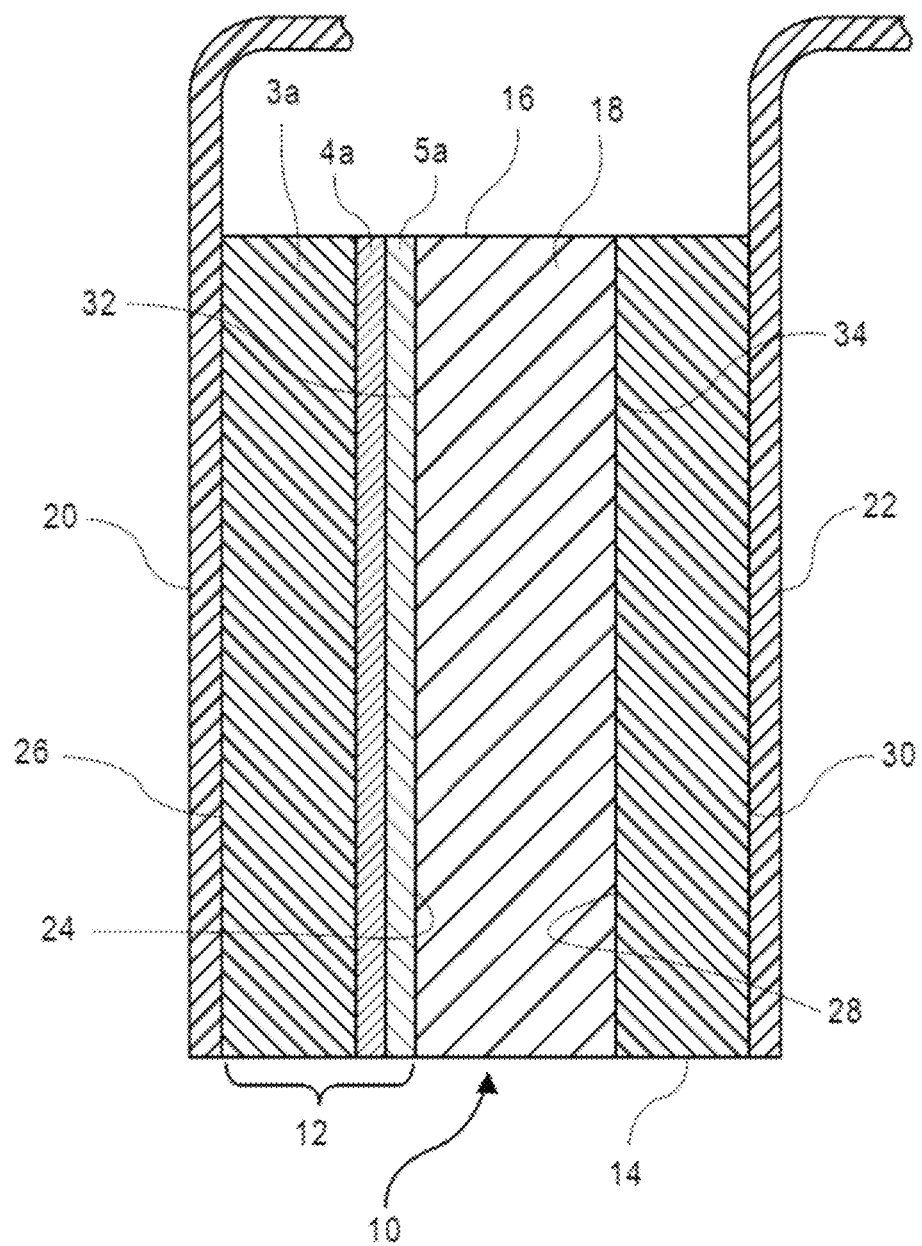
FIG. 2 is a cross-sectional view of a lithium-containing electrochemical cell according to one aspect of the disclosure.

A lithium-containing electrochemical cell for use in batteries, for example, a lithium ion battery or a lithium sulfur battery, or as capacitors is provided herein. The lithium-containing electrochemical cell may comprise a negative electrode layer, a positive electrode layer spaced apart from the negative electrode layer, a porous separator disposed between confronting surfaces of the negative electrode layer and the positive electrode layer, and a liquid electrolyte infiltrating the negative electrode layer, the positive electrode layer, and the porous separator. For example, as best shown in FIG. 2, a lithium-containing electrochemical cell 10 (also referred to herein as "the electrochemical cell 10" or "cell 10") of a lithium ion battery (not shown) includes a negative electrode layer 12, a positive electrode layer 14, a porous separator 16, and a liquid electrolyte 18 that impregnates, infiltrates, or wets the surfaces of and fills the pores of each of the negative electrode layer 12, the positive electrode layer 14, and the porous separator 16. A negative electrode current collector 20 is positioned adjacent and electrically coupled to the negative electrode layer 12, and a positive electrode current collector 22 is positioned adjacent and electrically coupled to the positive electrode layer 14.

The negative and positive electrode layers 12, 14 may be coated, deposited, or otherwise formed on opposing major surfaces of the negative and positive electrode current collectors 20, 22. The negative electrode layer 12 includes an anterior surface 24 and an opposite posterior surface 26 relative to the location of the separator 16. The positive electrode layer 14 is spaced-apart from the negative electrode layer 12 and similarly includes an anterior surface 28 and an opposite posterior surface 30. In assembly, the anterior surfaces 24, 28 of the negative and positive electrodes 12, 14 confront one another, with the separator 16 sandwiched between the confronting anterior surfaces 24, 28 of the negative and positive electrode layers 12, 14. In particular, the separator 16 includes a first side 32 that faces toward the negative electrode layer 12 and an opposite second side 34 that faces toward the positive electrode 14. The negative electrode current collector 20 interfaces with or engages the posterior surface 26 of the negative electrode layer 12 and the positive electrode current collector 22 interfaces with or engages the posterior surface 30 of the positive electrode layer 14.

The electrochemical cell 10 may have a thickness, measured from an outer surface of the negative electrode current collector 20 to an opposite outer surface of the positive electrode current collector 22 in the range of about 100 µm to about 1 mm. Individually, the current collectors 20, 22 may have thicknesses of about 20 µm, the electrode layers 12, 14 may have thicknesses of up to 200 µm, and the porous separator 16 may have a thickness of about 25 µm.

In certain other variations, the electrochemical cell may be a supercapacitor, such as a lithium-ion based supercapacitor.

A. Negative Electrode

In various aspects, the negative electrode layer 12 may comprise the Li-containing electrode including a multi-layer protective coating as described above, for example, comprising a Li-containing layer 3a, a first layer 4a, and a second layer 5a, all as described herein. The first layer 4a may be present adjacent to or disposed on a surface of the Li-containing layer 3a. The second layer 5a may be adjacent to or disposed on the first layer 4a. The first layer 4a may comprise a first fluoropolymeric matrix as described herein and Li—F bonds and Li—F compounds. The second layer 5a may comprise a second fluoropolymeric matrix as described herein. The negative electrode layer 12 can undergo the reversible insertion, intercalation, or plating of lithium ions at a lower electrochemical potential than the material of the positive electrode layer 14 such that an electrochemical potential difference exists between the electrode layers 12, 14. In certain variations, the material of the negative electrode layer 12 may be generally described as an intercalation host material.

The negative electrode layer 12 may optionally further include metallic lithium, lithium based alloys (such as lithium silicon alloy, lithium aluminum alloy, lithium indium alloys), carbon-based materials (e.g., graphite, activated carbon, carbon black, and graphene), silicon, silicon-based alloys or composite materials, tin oxide, aluminum, indium, zinc, germanium, silicon oxide, titanium oxide, lithium titanate, and combinations thereof. The intercalation host material of the negative electrode layer 12 may be intermingled with a polymeric binder to provide the negative electrode layer 12 with structural integrity. Some examples of suitable polymeric binders include polyvinylidene fluoride (PVDF), ethylene propylene diene monomer (EPDM) rubber, styrene butadiene rubber (SBR), carboxymethyl cellulose (CMC), polyacrylic acid, and mixtures thereof. The negative electrode layer 12 optionally may include particles of an electrically conductive material, which may comprise very fine particles of, for example, high-surface area carbon black. In other variations, the negative electrode layer 12 may be a metal film or foil.

B. Positive Electrode

The positive electrode layer 14 may comprise any material that can undergo the reversible insertion, intercalation, or plating of lithium ions. In one form, the positive electrode layer 14 comprises a lithium-based intercalation host material having a higher electrochemical potential than the intercalation host material of the negative electrode layer 12. In certain variations, the intercalation host material of the positive electrode layer 14 suitably may comprise a layered oxide represented by the formula $LiMeO_2$, an olivine-type oxide represented by the formula $LiMePO_4$, a spinel-type oxide represented by the formula $LiMe_2O_4$, or a combination thereof, where Me is a transition metal. Some examples of suitable transition metals for the metal oxide of the intercalation host material of the positive electrode layer 14 include Co, Ni, Mn, Fe, Al, V, and combinations thereof.

More specifically, the lithium-based intercalation host material may comprise a layered lithium transition metal oxide, such as lithium cobalt oxide ($LiCoO_2$) and lithium-nickel-manganese-cobalt oxide [$Li(Ni_xMn_yCo_z)O_2$], a spinel lithium transition metal oxide, such as spinel lithium manganese oxide ($LiMn_2O_4$), lithium iron phosphate ($LiFePO_4$), or lithium fluorophosphate ($Li_2FePO_4F$), lithium nickel oxide ($LiNiO_2$), lithium aluminum manganese oxide ($Li_xAl_yMn_{1-y}O_2$), lithium vanadium oxide ($LiV_2O_5$), or a combination thereof. The same polymeric binder materials (PVdF, EPDM, SBR, CMC, polyacrylic acid) and electrically conductive particles (high-surface area carbon black) used in the negative electrode layer 12 also may be intermingled with the lithium-based intercalation host material of the positive electrode layer 14 for the same purposes.

Alternatively, the positive electrode layer 14 can comprise sulfur, for example, where the electrochemical cell is for use as a lithium sulfur battery. While in lithium ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode. In a lithium sulfur battery, positive electrodes may have elemental sulfur as the active material or a sulfur-containing active material.

C. Electrolyte

The electrolyte 18 may comprise any material that is capable of effectively conducting lithium ions through the porous separator 16 and between the negative and positive electrodes 12, 14. For example, the electrolyte 18 may be a liquid comprising a nonaqueous liquid electrolyte. In such case, the liquid electrolyte 18 may comprise a solution including a lithium salt dissolved or ionized in a nonaqueous, aprotic organic solvent or a mixture of nonaqueous, aprotic organic solvents. Some suitable lithium salts that may be used to make the electrolyte 18 include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and combinations thereof. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethyl methyl carbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a combination thereof. In some embodiments, the electrolyte may include fluorine-containing additives, such as but not limited to, fluoroethylene carbonate. Alternatively, the electrolyte may not include fluorine-containing additives. In some embodiments, the electrolyte may be an ether containing electrolyte, for example a lithium salt in an ether solvent, such as lithium bis(fluorosulfonyl) imide in 1,2-demethoxyethane.

D. Electrode Current Collectors

The negative and positive electrode current collectors 20, 22 respectively associated with the negative and positive electrode layers 12, 14 may comprise any metallic material capable of collecting and reversibly passing free electrons to and from their respective electrode layers 12, 14. For example, the negative and positive electrode current collectors 20, 22 may comprise thin and flexible metallic foils. In one specific example, the positive electrode current collector 22 may comprise aluminum, nickel, or stainless steel foils and the negative electrode current collector 20 may comprise copper, nickel, stainless steel, or titanium foils. Other types of metal foils or metallic materials may of course be used, if desired.

E. Porous Separator

The porous separator 16 may include, in instances, a microporous polymeric separator including a polyolefin (including those made from a homopolymer (derived from a single monomer constituent) or a heteropolymer (derived from more than one monomer constituent)), which may be either linear or branched. In certain aspects, the polyolefin may be polyethylene (PE), polypropylene (PP), or a blend of PE and PP, or multi-layered structured porous films of PE and/or PP. Commercially available polyolefin porous separator membranes include CELGARD® 2500 (a monolayer polypropylene separator) and CELGARD® 2320 (a trilayer polypropylene/polyethylene/polypropylene separator) available from Celgard LLC.

When the porous separator 16 is a microporous polymeric separator, it may be a single layer or a multi-layer laminate. For example, in one embodiment, a single layer of the polyolefin may form the entire microporous polymer separator 16. In other aspects, the separator 16 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 16. The microporous polymer separator 16 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, and/or combinations thereof.

Furthermore, the porous separator 16 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 16 are contemplated, as well as the many manufacturing methods that may be employed to produce such a microporous polymer separator 16.

III. Battery

Figure 3:
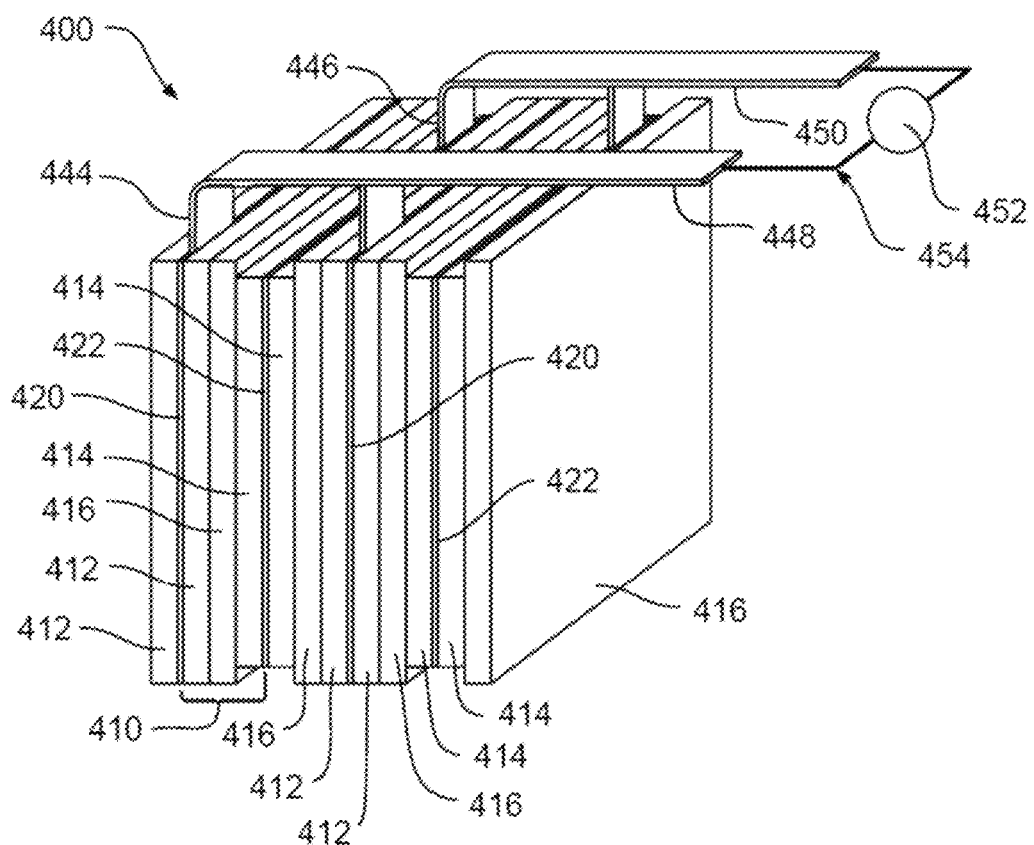
FIG. 3 is a partial perspective view of a lithium ion battery including a plurality of stacked electrochemical cells according to one aspect of the disclosure.

Referring now to FIG. 3, the electrochemical cell 10 may be combined with one or more other electrochemical cells to produce a lithium ion battery 400. The lithium ion battery 400 illustrated in FIG. 3 includes multiple rectangular-shaped electrochemical cells 410. Anywhere from 5 to 150 electrochemical cells 410 may be stacked side-by-side in a modular configuration and connected in series or parallel to form a lithium ion battery 400, for example, for use in a vehicle powertrain. The lithium ion battery 400 can be further connected serially or in parallel to other similarly constructed lithium ion batteries to form a lithium ion battery pack that exhibits the voltage and current capacity demanded for a particular application, e.g., for a vehicle. It should be understood the lithium ion battery 400 shown in FIG. 3 is only a schematic illustration, and is not intended to inform the relative sizes of the components of any of the electrochemical cells 410 or to limit the wide variety of structural configurations a lithium ion battery 400 may assume. Various structural modifications to the lithium ion battery 400 shown in FIG. 3 are possible despite what is explicitly illustrated.

Each electrochemical cell 410 includes a negative electrode 412, a positive electrode 414, and a separator 416 situated between the two electrodes 412, 414. Each of the negative electrode 412, the positive electrode 414, and the separator 416 is impregnated, infiltrated, or wetted with a liquid electrolyte capable of transporting lithium ions. A negative electrode current collector 420 that includes a negative polarity tab 444 is located between the negative electrodes 412 of adjacent electrochemical cells 410. Likewise, a positive electrode current collector 422 that includes a positive polarity tab 446 is located between neighboring positive electrodes 414. The negative polarity tab 444 is electrically coupled to a negative terminal 448 and the positive polarity tab 446 is electrically coupled to a positive terminal 450. An applied compressive force usually presses the current collectors 420, 422, against the electrodes 412, 414 and the electrodes 412, 414 against the separator 416 to achieve intimate interfacial contact between the several contacting components of each electrochemical cell 410.

One or more of the negative electrodes 412 may comprise a Li-containing electrode, like the Li-containing electrode 1 and 12 depicted in FIGS. 1 and 2, respectively. In such case, the one or more negative electrodes 412 each may include a Li-containing layer, a first layer comprising a first fluoropolymeric matrix and Li—F bonds or Li—F compounds adjacent to a surface of the Li-containing layer, and a second layer comprising a second fluoropolymeric matrix adjacent to the first layer, all as described herein.

In the embodiment depicted in FIG. 3, the battery 400 includes two pairs of positive and negative electrodes 412, 414. In other embodiments, the battery 400 may include more than two pairs of positive and negative electrodes 412, 414. In one form, the battery 400 may include 15-60 pairs of positive and negative electrodes 412, 414. In addition, although the battery 400 depicted in FIG. 3 is made up of a plurality of discrete electrodes 412, 414 and separators 416, other arrangements are certainly possible. For example, instead of discrete separators 416, the positive and negative electrodes 412, 414 may be separated from one another by winding or interweaving a single continuous separator sheet between the positive and negative electrodes 412, 414. In another example, the battery 400 may include continuous and sequentially stacked positive electrode, separator, and negative electrode sheets folded or rolled together to form a "jelly roll."

The negative and positive terminals 448, 450 of the lithium ion battery 400 are connected to an electrical device 452 as part of an interruptible circuit 454 established between the negative electrodes 412 and the positive electrodes 414 of the many electrochemical cells 410. The electrical device 452 may comprise an electrical load or power-generating device. An electrical load is a power-consuming device that is powered fully or partially by the lithium ion battery 400. Conversely, a power-generating device is one that charges or re-powers the lithium ion battery 400 through an applied external voltage. The electrical load and the power-generating device can be the same device in some instances. For example, the electrical device 452 may be an electric motor for a hybrid electric vehicle or an extended range electric vehicle that is designed to draw an electric current from the lithium ion battery 400 during acceleration and provide a regenerative electric current to the lithium ion battery 400 during deceleration. The electrical load and the power-generating device can also be different devices. For example the electrical load may be an electric motor for a hybrid electric vehicle or an extended range electric vehicle and the power-generating device may be an AC wall outlet, an internal combustion engine, and/or a vehicle alternator.

The lithium ion battery 400 can provide a useful electrical current to the electrical device 452 by way of the reversible electrochemical reactions that occur in the electrochemical cells 410 when the interruptible circuit 454 is closed to connect the negative terminal 448 and the positive terminal 450 at a time when the negative electrodes 412 contain a sufficient quantity of intercalated lithium (i.e., during discharge). When the negative electrodes 412 are depleted of intercalated lithium and the capacity of the electrochemical cells 410 is spent. The lithium ion battery 400 can be charged or re-powered by applying an external voltage originating from the electrical device 452 to the electrochemical cells 410 to reverse the electrochemical reactions that occurred during discharge.

Although not depicted in the drawings, the lithium ion battery 400 may include a wide range of other components. For example, the lithium ion battery 400 may include a casing, gaskets, terminal caps, and any other desirable components or materials that may be situated between or around the electrochemical cells 410 for performance related or other practical purposes. For example, the lithium ion battery 400 may be enclosed within a case (not shown). The case may comprise a metal, such as aluminum or steel, or the case may comprise a film pouch material with multiple layers of lamination. In one form, lithiated zeolite particles may be disposed on a surface of the case for the lithium ion battery 400 (not shown).

EXAMPLES

Example 1—Preparation of Protective Coatings

Example 1a—Preparation of Protective Coatings on Li-Containing Electrodes

A radio frequency (RF) magnetron sputtering system integrated in the glovebox was used to deposit fluorine polymers, polyvinylidene fluoride (PVDF) and polytetrafluoroethylene (PTFE), at room temperature (about 18° C. to about 25° C.) to form a PTFE-derived coating on a Li electrode (referred to as "PTFE Li Electrode") and PVDF-derived coating on a Li electrode (referred to as "PVDF Li Electrode"). The Li electrodes used had a Li layer with a thickness of 90 μm, which was laminated on a stainless-steel foil substrate having a thickness of 20 μm. The targets used for sputtering were 3 inch PTFE and PVDF plates. The RF power used during sputtering was 170 W with 2 sccm (standard cubic centimeter per minute) of Ar flow. The thickness of the PTFE-derived and PVDF-derived coatings was measured with a quartz crystal micro balance (QCMB). Due to the reaction with Li, the actual thickness value would be about 2 or 3 times higher than as the reading from QCMB. The actual thickness of the PTFE-derived and PVDF-derived coatings was about 150 nm to about 200 nm.

The same process as described above was used to form a first PTFE-derived coating on a Li electrode followed by forming a second PVDF-derived coating on the Li electrode to obtain a Li electrode with a two layer coating (referred to as "PTFE-PVDF Li Electrode").

Example 1B—Preparation of Protective Coating on Stainless Steel Substrates

For comparison, a similar process as described in Example 1A was used to coat PTFE and PVDF on a stainless steel foil substrate having a thickness of 50 μm without the Li layer to obtain a PTFE-derived coating on a stainless steel substrate (referred to as "PTFE Stainless Steel") and PVDF-derived coating on a stainless steel substrate (referred to as "PVDF Stainless Steel").

Example 2—Coating Characterization

The coating structure of PTFE Li Electrode, PVDF Li Electrode, PTFE Stainless Steel, and PVDF Stainless Steel were characterized using Field Emission Scanning Electron Microscopy (FE-SEM), X-Ray Diffraction (XRD), and Fourier-transform infrared spectroscopy (FTIR).

Figure 4:
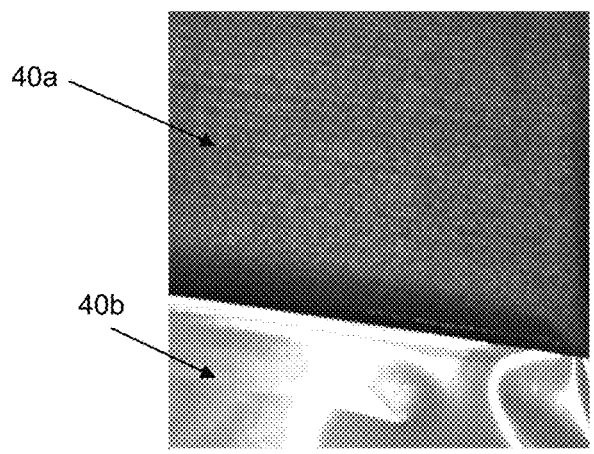
FIG. 4 is a photograph of PTFE Li Electrode and PTFE Stainless Steel.
Figure 5A:
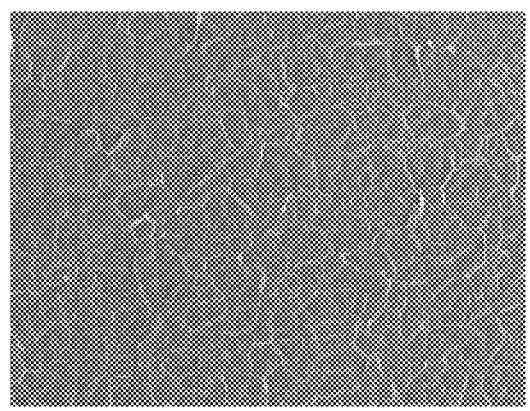
FIGS. 5A-5C are Field Emission Scanning Electron Microscopy (FE-SEM) images of the PTFE Li Electrode at the magnifications, 50×, 5000×, and 50000×, respectively.
Figure 5B:
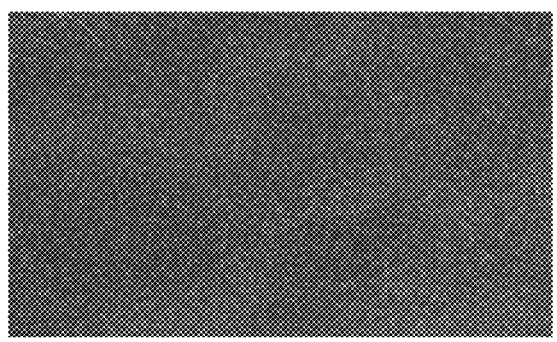
Figure 5C:
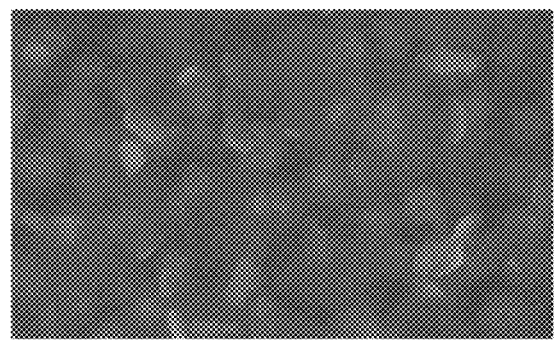

FIG. 4 shows a portion of the PTFE Li Electrode 40a (upper black image) and PTFE Stainless Steel 40b (lower lighter image). Before PTFE deposition, the Li layer has a silver-like color. However, after the deposition, the top surface color became black due to the defluorination reaction between ionized PTFE species and the Li metal present in the Li layer. In contrast, the coating deposited on stainless steel was semitransparent, indicting no significant structure change in the PTFE-derived coating on stainless steel. The defluorination reaction caused volume expansion, leading to slight curvature around the edge of the PTFE Stainless Steel 40b. FIGS. 5A, 5B and 5C show FE-SEM images of the surface morphologies of the PTFE-derived coating in the PTFE Li Electrode sample at magnifications 50×, 5000×, and 50000×, respectively. Due to the defluorination reaction, a unique nanocomposite or fluoropolymeric matrix formed on the Li layer surface, where some nano-sized (~100 nm characteristic length) particles were embedded in the matrix as shown in the higher magnification FE-SEM image in FIG. 5C.

Figure 6:
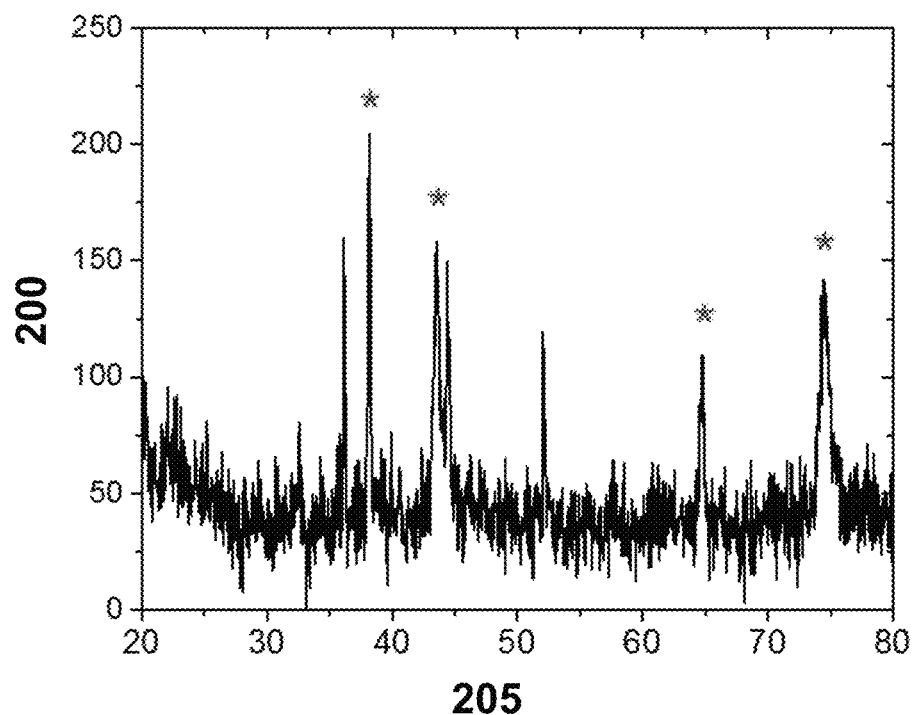
FIG. 6 depicts an X-Ray Diffraction (XRD) pattern for PTFE Li Electrode.
Figure 7A:
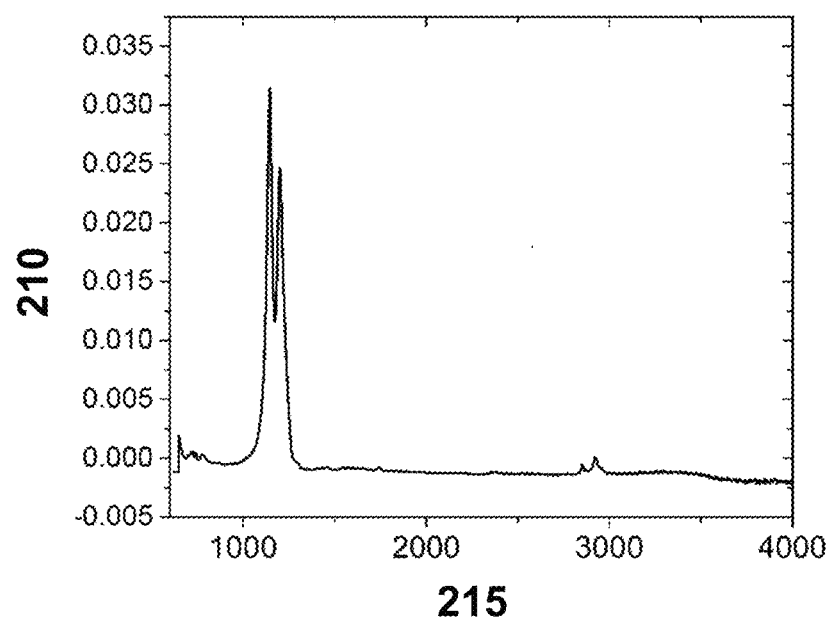
FIGS. 7A-7C depict a Fourier-transform infrared (FTIR) spectra for PTFE plate, PTFE Stainless Steel, and PTFE Li Electrode, respectively.
Figure 7B:
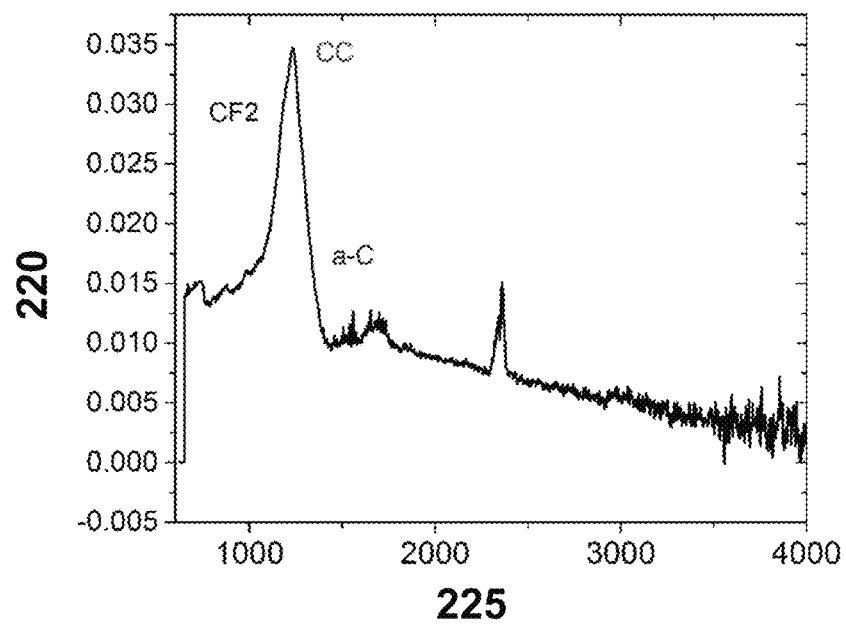
Figure 7C:
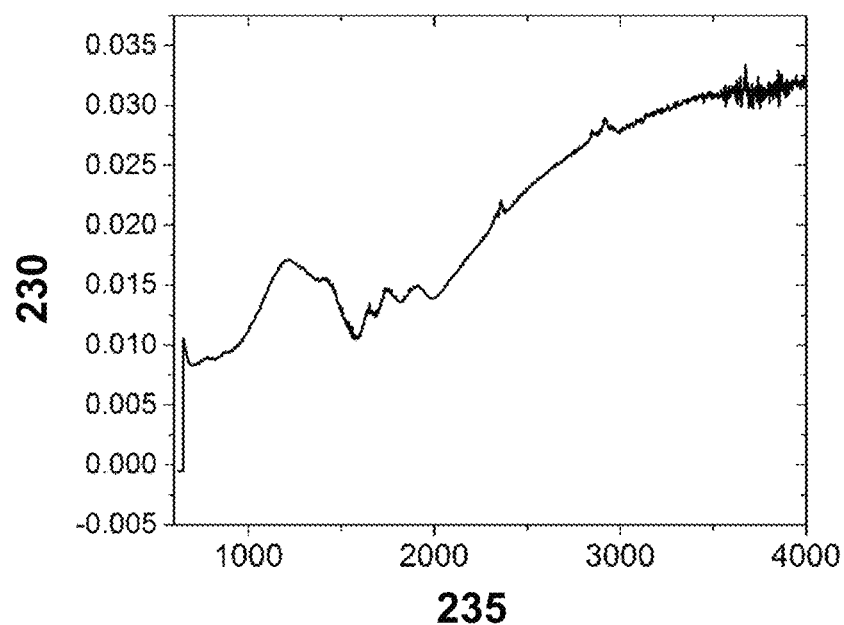

FIGS. 6 and 7A-7C provide structural characterization of the PTFE-derived coatings in the PTFE Li Electrode sample, and the PTFE Stainless Steel sample, as well as for a PTFE plate used as a target ("PTFE plate"). In FIG. 6, the y-axis 200 shows intensity (a.u) and the x-axis 205 shows 2θ. In FIG. 6, the asterisks identify peaks associated with crystalline LiF. As shown in the graph, the XRD peaks for the PTFE Li Electrode matched those from crystalline LiF. Therefore, the nano-sized particles in the fluoropolymeric matrix shown in FIGS. 5A-5C were identified as LiF. The comparison of FTIR spectra in FIGS. 7A-7C of the PTFE plate, PTFE Stainless Steel, and PTFE Li Electrode, respectively, showed the coating structural change on Li metal surface due to the defluorination reaction. In FIG. 7A, the y-axis 210 shows adsorption and the x-axis 215 shows wavenumber (cm$^{-1}$). In FIG. 7A, the adsorption peaks from bulk PTFE shows the typical C—F bonds around 1151 cm$^{-1}$ (C—F asymmetric stretching mode) and 1209 cm (C—F symmetric stretching mode). In FIG. 7B, the y-axis 220 shows adsorption and the x-axis 225 shows wavenumber (cm$^{-1}$). However, as shown in FIG. 7B, the peak intensity became weaker after PTFE was sputtered to stainless substrate due to the ionization of PTFE in the plasma which partially broke C—F bonds. In FIG. 7C, the y-axis 230 shows adsorption and the x-axis 235 shows wavenumber (cm$^{-1}$). As shown in FIG. 7C, the peak essentially disappeared when the PTFE was deposited on Li metal to form PTFE Li Electrode due to the reaction between Li and partially broken C—F bonds from the plasma ionization, indicating that the coating had a different structure from PTFE. On the other hand, the strong Raman D and G peaks were observed between 1400 to 1700 cm$^{-1}$, due to the formation of carbonaceous materials. It has been generally accepted that C—C symmetric bonds were not IR active. The appearance of D and G peak in FTIR indicated F may have broken the symmetry of sp$^2$ domains and have made it active. Similar phenomena have also been found in carbon nitride based coating, where N breaks the symmetry of sp$^2$ C domains and makes graphitic carbon IR active. Combining the results discussed above, it can be determined that the reaction between ionized PTFE and Li in the Li layer led to the formation of nano-sized LiF crystals within a carbonaceous polymeric matrix in the PTFE Li Electrode. This unique nanostructure has been considered as the desirable SEI layer for lithium metal electrodes.

Figure 8:
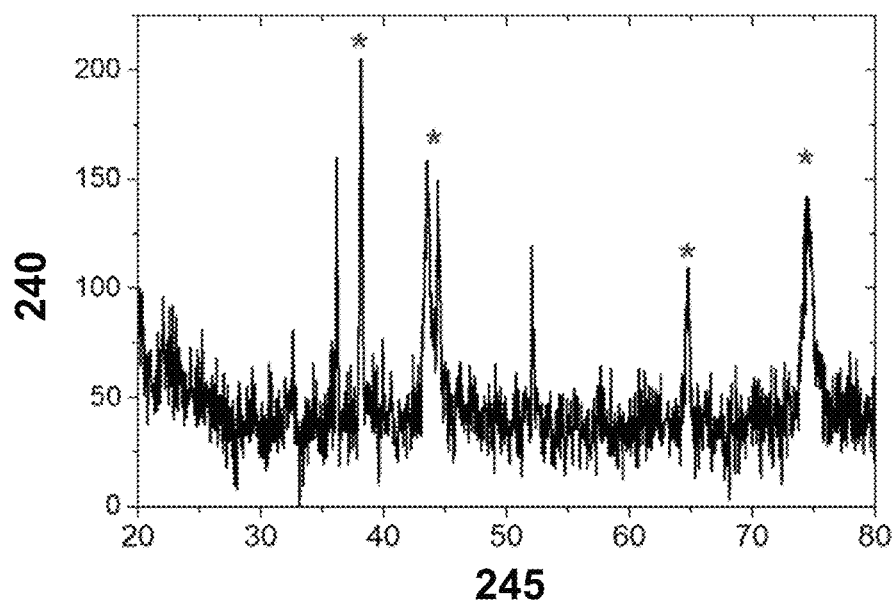
FIG. 8 depicts an XRD pattern for PVDF Li Electrode.
Figure 9A:
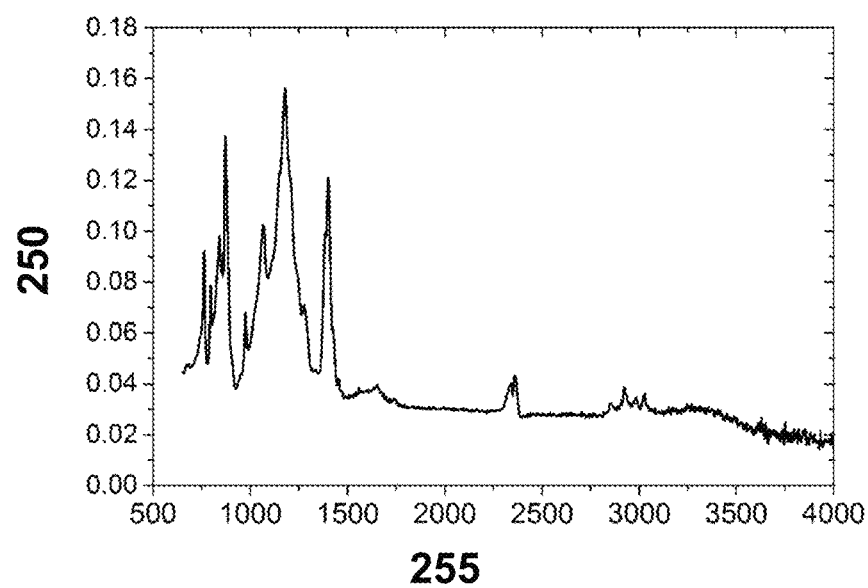
FIGS. 9A-9C depict FTIR spectra for PVDF plate, PVDF Stainless Steel, and PVDF Li Electrode.
Figure 9B:
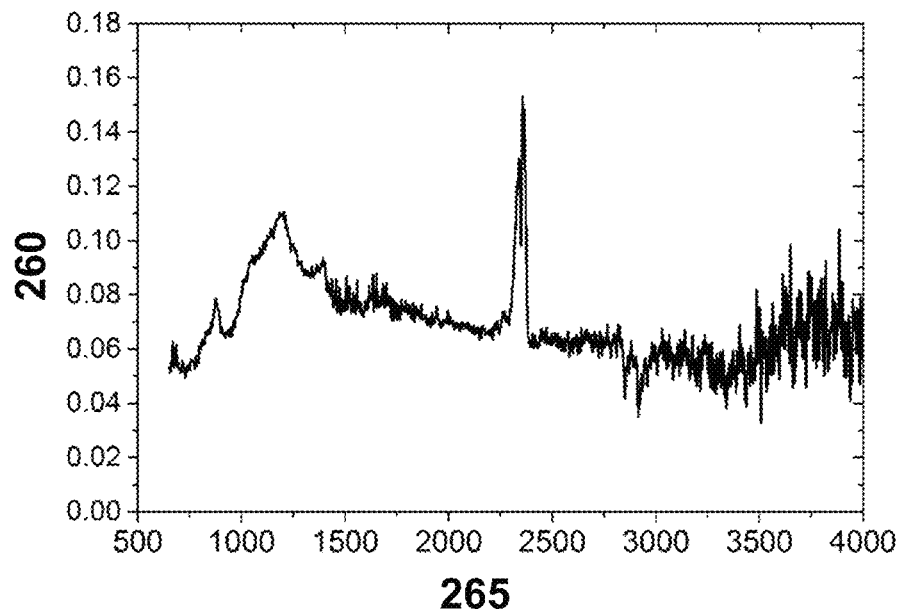
Figure 9C:
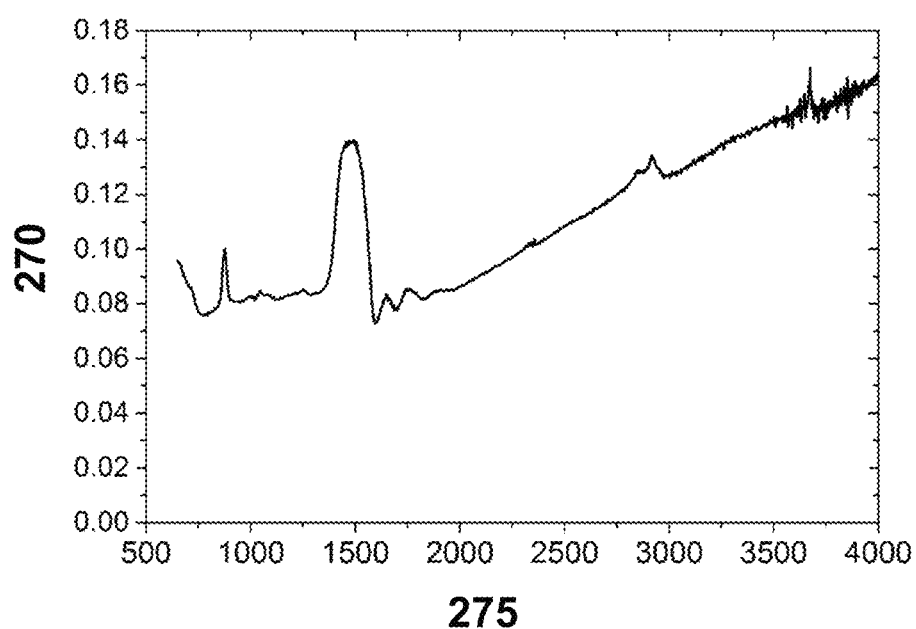

FIGS. 8 and 9A-9C provide the structural characterization of the PVDF-derived coatings in the PVDF Li Electrode sample, and the PVDF Stainless Steel sample, as well as for a PVDF plate used as a target ("PVDF plate"). FIG. 8 provides the XRD pattern for the PVDF Li Electrode, where the x-axis 240 shows intensity (a.u) and the x-axis 245 shows 2θ. In FIG. 8, the asterisks identify peaks associated with crystalline LiF. FIGS. 9A-9C provide a comparison of FTIR spectra of the PVDF plate, PVDF Stainless Steel, and PVDF Li Electrode, respectively. In FIG. 9A, the y-axis 250 shows adsorption and the x-axis 255 shows wavenumber (cm$^{-1}$). In FIG. 9B, the y-axis 260 shows adsorption and the x-axis 265 shows wavenumber (cm$^{-1}$). In FIG. 9C, the y-axis 270 shows adsorption and the x-axis 275 shows wavenumber (cm$^{-1}$).

Example 3—Performance Testing

Figure 10A:
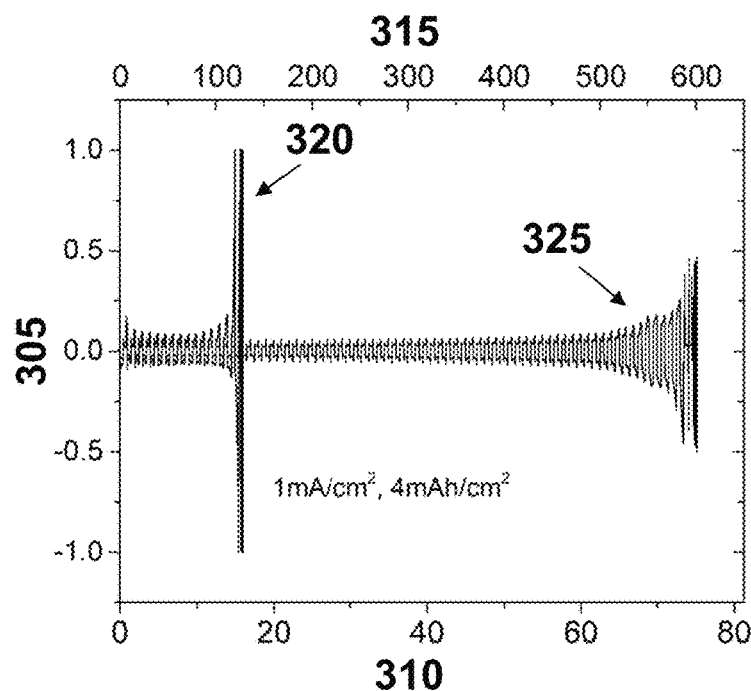
FIG. 10A depicts Voltage (volt) versus Cycle Number and Cycle Time (hours) for the Li Electrode in carbonate electrolyte and the PTFE Li Electrode in carbonate electrolyte.

The PTFE Li Electrode and a metallic lithium electrode without a protective coating (referred to as "Li Electrode") were each used in symmetrical cells (both the positive and negative electrodes were the same) and each were cycled in carbonate based electrolyte at 4 mAh/cm$^2$ current intensity, which is equivalent to about 20 μm Li plating and stripping between two electrodes. These can be considered harsh test conditions. FIG. 10A shows the voltage profiles of Li Electrode 320 and the PTFE Li Electrode 325, which were cycled in carbonate based electrolyte. In FIG. 10A, the y-axis 305 shows voltage (V), the first x-axis 310 shows cycle number, and the second x-axis 315 shows cycle time (hours). As shown in FIG. 10A, without coating protection, the Li Electrode 320 only completed about 15 cycles in the typical carbonate based electrolyte before the potential exceeded the setting limit due to the large impedance caused by extra SEI formation. With the protective coating, the PTFE Li Electrode 325 had improved cycle stability with up to about 75 cycles before it reached the over potential limit, which demonstrated that the coating effectively protected the Li electrode and suppressed the mossy Li formation. It is understood by those of skill in the art that a carbonate based electrolyte containing ethylene carbonate (EC) may be used to quickly screen or compare the effect of different protective coatings.

Figure 10B:
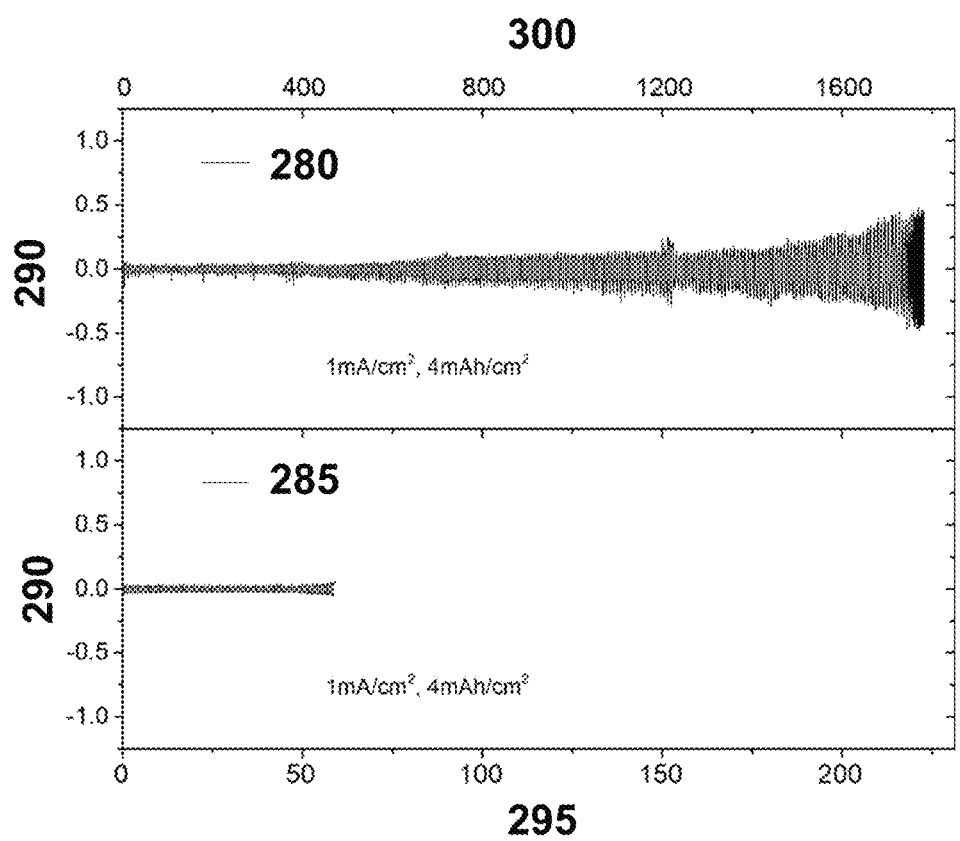
FIG. 10B depicts Voltage (volt) versus Cycle Number and Cycle Time (hours) for the Li Electrode in ether electrolyte and the PTFE Li Electrode in ether electrolyte.

The effect of the type of electrolyte used was also studied. FIG. 10B shows the voltage profiles of Li Electrode 285 and the PTFE Li Electrode 280, which were used in symmetrical cells and each cycled in ether based electrolyte. In FIG. 10B, the y-axis 290 shows voltage (V), the first x-axis 295 shows cycle number, and the second x-axis 300 shows cycle time (hours). As shown in FIG. 10B, for the ether based electrolyte, the Li Electrode 285 (lower graph) only cycled up to about 50 cycles. In contrast, the protective coating extended the cycle life up to about 200 cycles for the PTFE Li Electrode 280 (upper graph). With the protective coating, the Li electrode had a much smoother profile, indicating less side reaction and more uniform plating and stripping. In addition, the overpotential was lower, because the coating suppressed the electrolyte decomposition leading to less SEI formed on the surface.

It appeared that the combined effect of protective coating and electrolyte selection led to the extension of cycle life. On the other hand, the over-potential of protected Li kept increasing with cycle number with the formation of mossy Li. Thus, the protective coating mitigated the electrolyte decomposition and suppressed the SEI formation from the electrolyte, particularly when compared to the base line electrolyte.

Figure 11A:
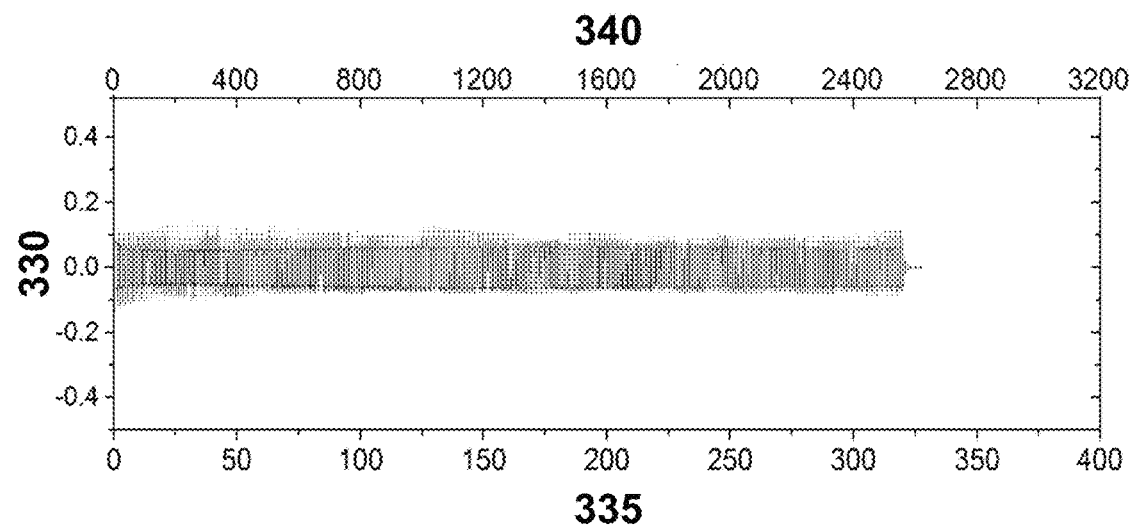
FIG. 11A depicts Voltage (volt) versus Cycle Number and Test Time (hours) for the PTFE Li Electrode.
Figure 11B:
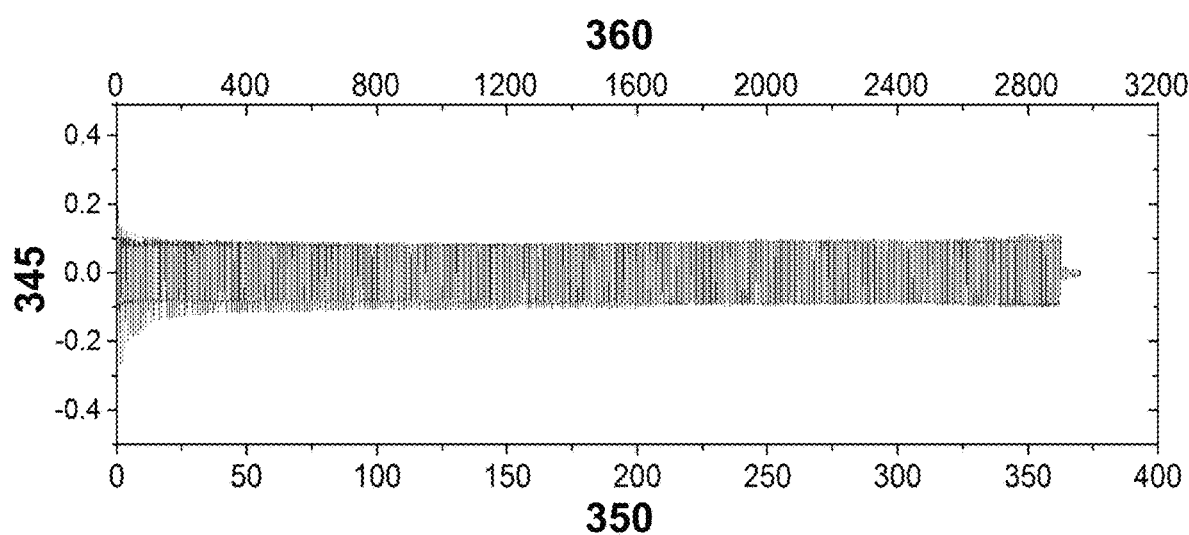
FIG. 11B depicts Voltage (volt) versus Cycle Number and Test Time (hours) for the PTFE-PVDF Li Electrode.

In order to further extend the cycle life and suppress the over-optional increase, a high concentration electrolyte with 4M lithium bis(fluorosulfonyl)imide (LiFSI) salt in 1,2-dimethoxy electrolyte developed by at Pacific Northwest National Laboratory (Qian, J. et al. High rate and stable cycling of lithium metal anode. *Nat. Commun.* 6:6362 doi: 10.1038/ncomms7362 (2015) was used to test PTFE Li Electrode and PTFE-PVDF Li Electrode each used in symmetrical cells. All the tests were performed in a harsh testing conditions including about 10 mAh/cm$^2$ on each current collector when a 90 µm thick Li foil was used. The calculated average cycle efficiency was around 99.17. The results showed increased improvement in the cycle stability. Within 320 cycles, no increase of the over-potential was detected due to the combination of protective coating and advanced electrolyte for the PTFE Li Electrode, as shown in FIG. 11A. In FIG. 11A, the y-axis 330 shows voltage (V), the first x-axis 335 shows cycle number, and the second x-axis 340 shows test time (hours). The cell failed at the end due to a short circuit, so there should be extra Li available, resulting in above 99.17% real cycle efficiency for the first 300 cycles. In FIG. 11B, the y-axis 345 shows voltage (V), the first x-axis 350 shows cycle number, and the second x-axis 355 shows test time (hours). As shown in FIG. 11B, the PTFE-PVDF Li Electrode with the two-layer coating showed further improvement of the cycle stability. The PVDF-derived layer was more flexible and can better accommodate the volume expansion, and the PTFE-derived layer can more effectively suppress dendrite growth, due to better interfacial adhesion to Li metal and higher mechanical strength by forming LiF/C nanocomposite.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for preparing a protective coating on a Li-containing electrode having a surface comprising a Li-containing layer, the method comprising:
    applying a first fluoropolymer, a first fluoropolymer precursor, or a combination thereof to the surface comprising the Li-containing layer of the Li-containing electrode to form a first layer comprising a first fluoropolymeric matrix and Li—F bonds; and
    applying a second fluoropolymer, a second fluoropolymer precursor, or a combination thereof to the Li-containing electrode to form a second layer comprising a second fluoropolymeric matrix, wherein the second layer is adjacent to the first layer;
    wherein the first layer has a fluorine content greater than the second layer; and
    wherein (i) the first layer is formed by a first defluorination reaction of the first fluoropolymer, the first flouoropolymer precursor, or a combination thereof, (ii) the second layer is formed by a second defluorination reaction of the second fluoropolymer, the second fluoropolymer precursor or a combination thereof, or (iii) a combination of (i) and (ii).

2. The method of claim 1, wherein the first layer has a fluorine content of about 5 at % to about 70 at %.

3. The method of claim 1, wherein the first layer has a thickness of about 1 nm to about 5 µm, the second layer has thickness of about 1 nm to about 5 µm, or a combination thereof.

4. The method of claim 1, wherein the first fluoropolymer and the second fluoropolymer are the same or different, and the first fluoropolymer precursor and the second fluoropolymer precursor are the same or different.

5. The method of claim 1, wherein: (i) the first fluoropolymer and the second fluoropolymer are each selected from the group consisting of polyvinyl fluoride (PVF), polyvinylidene fluoride (PVDF), polytetrafluoroethylene (PTFE), polychlorotrifluoroethylene (PCTFE), perfluoroalkoxy alkane (PFA), fluorinated ethylene propylene (FEP), ethylene tetrafluoroethylene (ETFE), ethylene chlorotrifluoroethylene (ECTFE), perfluoro-elastomer (FFPM), and a combination thereof; (ii) the first fluoropolymer precursor and the second fluoropolymer precursor each form a polymer selected from the group consisting of PVF, PVDF, PTFE, PCTFE, PFA, FEP, ETFE, ECTFE, FFPM, and a combination thereof; or (iii) a combination of (i) and (ii).

6. The method of claim 1, wherein the first fluoropolymer is PTFE and the second fluoropolymer is PVDF.

7. The method of claim 1, wherein first fluoropolymer, the second fluoropolymer, or a combination thereof are applied by physical vapor deposition, chemical vapor deposition, or wet chemistry.

8. The method of claim 1, further comprising treating the Li-containing electrode to remove a passivation layer present on the Li-containing layer before applying the first fluoropolymer, the first fluoropolymer precursor, or a combination thereof.

9. The method of claim 1, further comprising maintaining the Li-containing electrode at a temperature of less than or equal to about 150° C. for up to about 24 hours after applying: (i) the first fluoropolymer, the first fluoropolymer precursor, or a combination thereof; (ii) the second fluoropolymer, the second fluoropolymer precursor, or a combination thereof; or (iii) a combination of (i) and (ii).

10. The method of claim 1, wherein the Li—F bonds are present as LiF particles within the first fluoropolymeric matrix.

* * * * *